United States Patent [19]

Bragdon

[11] Patent Number: 4,602,203
[45] Date of Patent: Jul. 22, 1986

[54] INFRARED BATTERY DETECTOR AND CHARGING SYSTEM

[75] Inventor: Harold W. Bragdon, Topeka, Kans.

[73] Assignee: Med Care of Kansas, Incorporated, Topeka, Kans.

[21] Appl. No.: 667,343

[22] Filed: Nov. 1, 1984

[51] Int. Cl.⁴ .............................................. H02J 7/10
[52] U.S. Cl. ......................................... 320/2; 320/25; 320/37; 250/222.1
[58] Field of Search .................. 320/2, 25, 37, 38; 250/222.1

[56] References Cited

U.S. PATENT DOCUMENTS

| | | | |
|---|---|---|---|
| 3,622,396 | 11/1971 | Fernandez et al. | 250/222.1 X |
| 3,781,631 | 12/1973 | Nelson et al. | 320/25 |
| 4,286,204 | 8/1981 | Belot | 320/37 X |
| 4,393,432 | 7/1983 | Neuhaus et al. | 320/25 X |
| 4,419,616 | 12/1983 | Baskins et al. | 320/2 |

FOREIGN PATENT DOCUMENTS 0615567  2/1978  U.S.S.R. ................................. 320/25

Primary Examiner—R. J. Hickey
Attorney, Agent, or Firm—Schmidt, Johnson, Hovey & Williams

[57] ABSTRACT

A battery charging system for rectangular, 9-volt batteries has inclined holders with mesh contacts engageable with the terminals of an inserted battery. Reflective tape is affixed to one side of the battery, and an opto-electronic assembly presents a sensing signal whenever the battery is received in one orientation in the holder. The sensing signal reinitializes a pulse counter which then counts a predetermined number of timing reference pulses from a pulse generator. Simultaneously, a control means coupled to the sensing signal renders a charging circuit conductive to charge the battery. Once the pulse counter has received a predetermined number of pulses, the charging circuit is interrupted. If the battery is incorrectly inserted, the charging circuits will not charge the battery, and also a reverse polarity alarm audibly indicates the error. Consequently, the charging system is foolproof, simple to use and can simultaneously charge a multitude of batteries without manual intervention.

4 Claims, 7 Drawing Figures

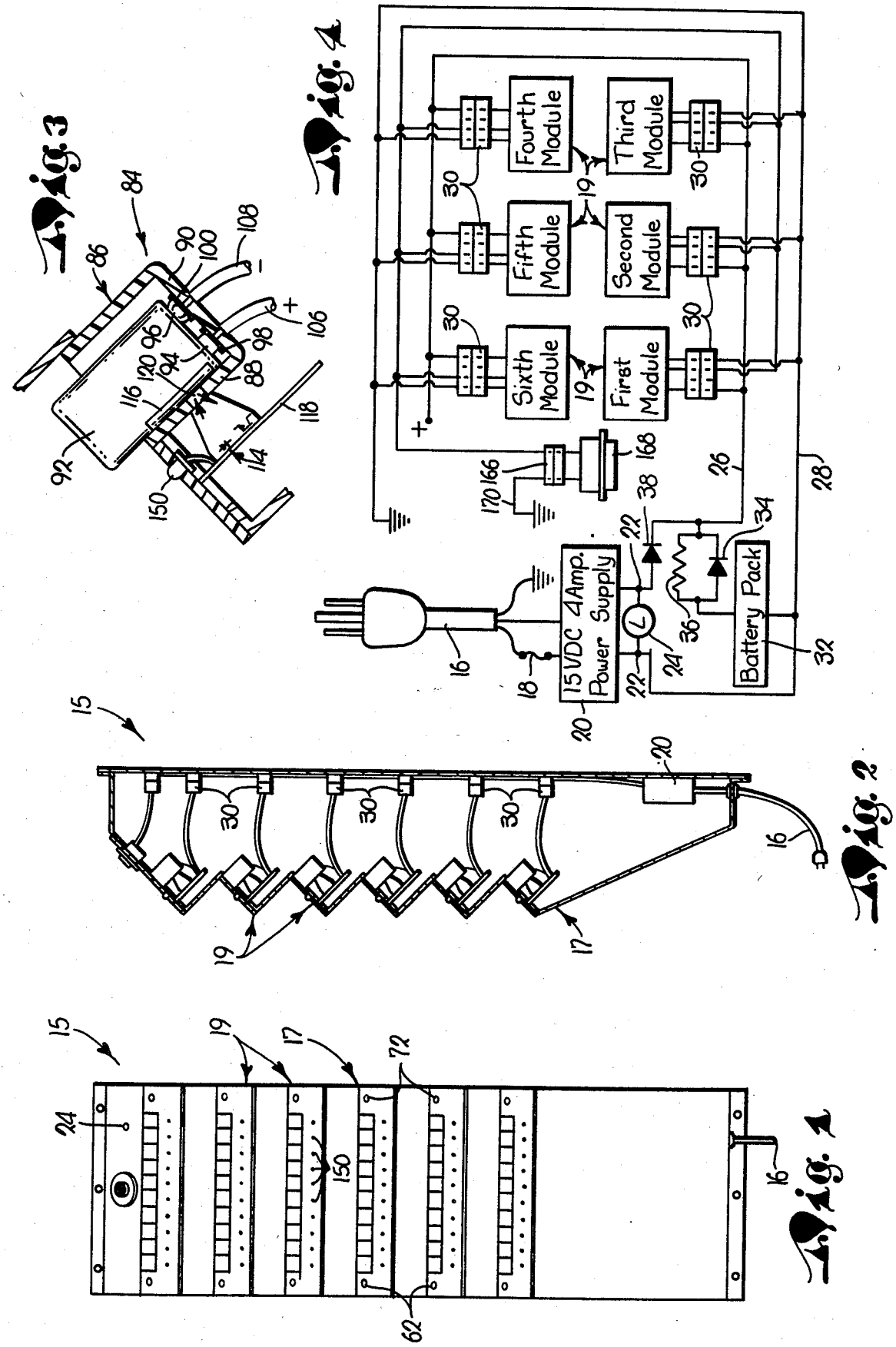

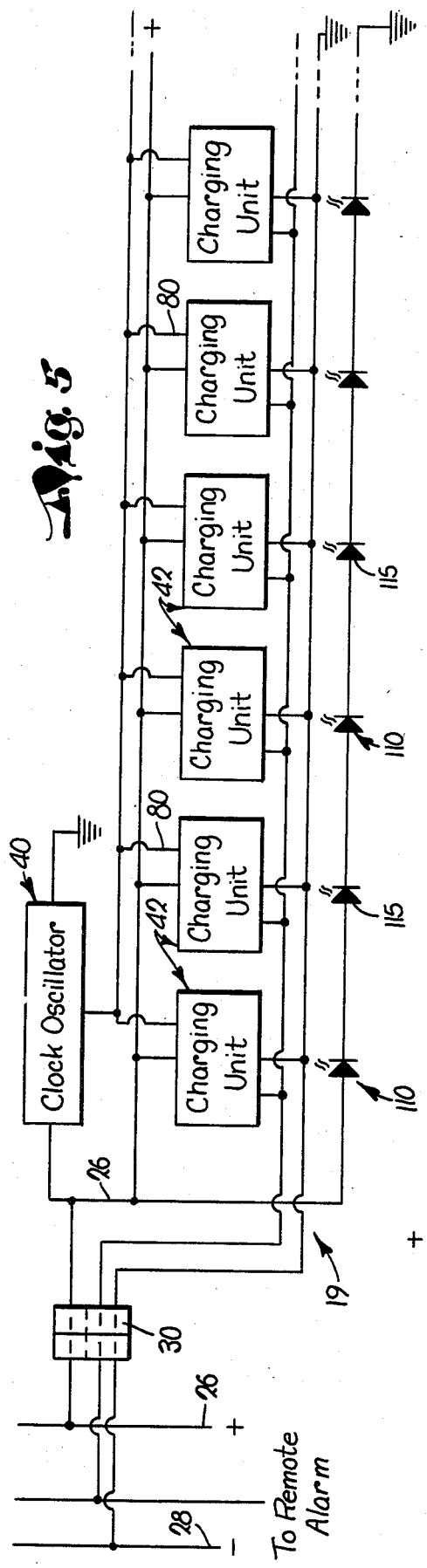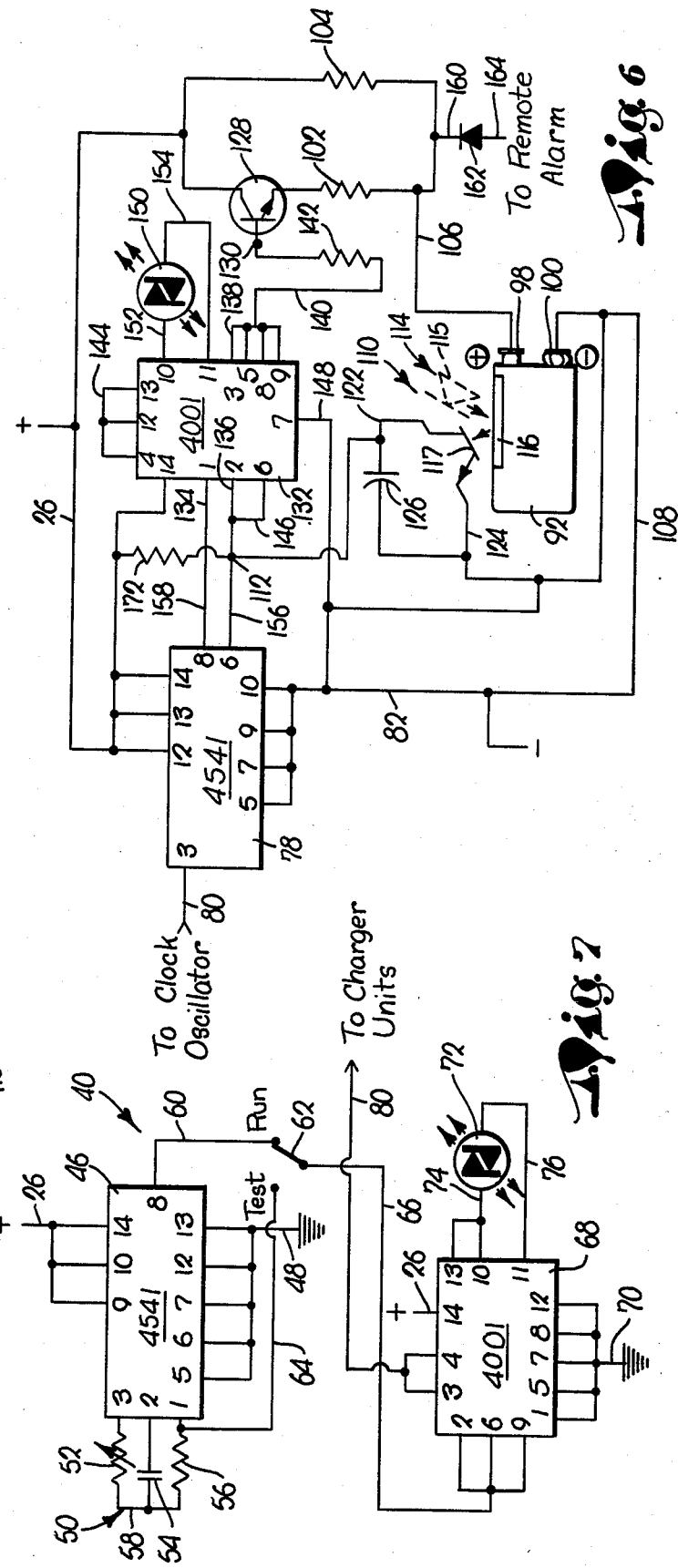

INFRARED BATTERY DETECTOR AND CHARGING SYSTEM

BACKGROUND OF THE INVENTION

1. Field Of The Invention

The present invention relates to a battery charging system having a charging circuit making and breaking control responsive to the polarity orientation of the battery when carried by the charging system support means.

2. Description Of The Prior Art

In recent years, use of battery powered transmitters for the telemetry monitoring of hospital patients has gained rapid acceptance. Typically, after an initial danger of impending or actual myocardial infarction or life threatening cardiac arrhythmias, patients are transferred to cardiac care units in hospitals which utilize telemetry to monitor the heart for further arrhythmias. These telemetry transmitters are worn by the patient and send a signal to a centralized nursing monitoring station where the patient's cardiac status can be monitored and recorded. Obviously, the use of telemetry frees the patient and nursing staff from the burden of cumbersome wires attached to each patient from the nursing station.

Unfortunately, the annual cost of purchasing disposable batteries for telemetry units is not insignificant. Commonly, a disposable mercury battery in such an application has a useful life of only two days.

While the use of rechargeable batteries in hospital can greatly reduce costs, nursing personnel have uniformly disapproved of battery charging systems heretofore known in the art. In a large hospital, there are many people responsible for changing telemetry batteries during all hours of the day. Consequently, charging systems which necessitate manual control and supervision are completely unacceptable.

SUMMARY OF THE INVENTION

The present invention overcomes to a large degree the disadvantage outlined above. The charging system is simple, foolproof and requires very little supervision from staff members. The system can indidually charge a number of batteries on separate, timed cycles with a minimum of components.

More specifically, the battery charging system in accordance with the instant invention broadly includes an inclined battery holder configured to receive a rectangular, 9 volt "transistor" battery in either of two possible orientations. The battery holder has a pair of metal mesh contacts which engage the terminals of an inserted battery. If the battery is incorrectly inserted, an audible alarm will sound, and the charging circuit will not operate to charge the battery.

A reflective tape is attached to one side of the battery, and an infrared light source coupled to the holder transmits the radiation toward the battery. If the battery is in a certain, correct one of the two possible orientations, the radiation strikes the tape and is reflected to a proximal infrared sensor. Subsequently, the infrared sensor activates an electronic switch to begin the charging period and simultaneously reintializes a digital pulse counter. The pulse counter receives a series of timing reference pulses from a pulse generator and presents an output signal after counting a predetermined number of pulses following reinitialization. An electronic switch is operably coupled with the pulse counter and interrupts the charging circuit when the timer output signal is presented.

Additionally, each holder has an LED indicating whether the battery is being charged or whether the charging cycle is complete. Also, once the charging cycle is complete, a second charging circuit provides a trickle charge which constantly maintains the battery in a charged, standby mode until the battery is eventually removed from the holder by the staff. As a result, the batteries may be indefinitely left unattended in the holder until eventual reuse.

The automatic battery charging system consequently requires a minimum of attention. The system can individually charge each battery during separate, timed cycles with a minimum of components. Simultaneously, the system automatically prevents the application of a reversed polarity charge on an incorrectly inserted battery.

BRIEF DESCRIPTION OF THE DRAWINGS

FIG. 1 is a front elevational view of the battery charging system housing;

FIG. 2 is a side cross-sectional view of the system;

FIG. 3 is an enlarged, fragmentary, sectional view of one of the battery holders and infrared sensors, showing a battery correctly inserted within the holder;

FIG. 4 is an electrical block and mechanical schematic diagram showing the relationship of the power supply, reserve power battery pack, and reversed polarity battery alarm to the modules;

FIG. 5 is an electrical block diagram of a portion of one of the modules;

FIG. 6 is a schematic diagram of the pulse counter, activating circuit and control means; and FIG. 7 is a schematic diagram of the pulse generator.

DESCRIPTION OF THE PREFERRED EMBODIMENT

The battery charging system is designated broadly by the numeral 15 and includes a normally upright, staircase-shaped housing 17. Six elongated, removable modules 19 extend horizontally across the housing 17 in stacked relationship.

As illustrated in FIG. 4, a 110 VAC power lead 16 is connected through a fuse 18 to an enclosed, 15 VDC, 4 amp power supply 20, which provides an electrical power output at a pair of output terminals 22 for battery charging. A main lamp 24 illuminates whenever said power output reaches the terminals 22.

The power supply 20 provides a battery charging output for each of the modules 19 through the leads 26, 28, the latter branching into each of the modules 19 by means of a releasable polarized connector 30. In the event of a line power failure, a rechargeable reserve power battery pack 32 connected to the leads 26, 28 will supply current to the modules 19 through a rectifier diode 34. The battery pack 32 is normally trickle-charged through a resistor 36. A diode 38 prevents the battery pack 32 from illuminating the lamp 24 whenever the power supply 20 is inoperable.

FIG. 5 represents the block schematic of each of the modules 19. As shown, a pulse generating means comprising a clock oscillator 40 provides a series of electrical timing reference pulses simultaneously to a row of charging units 42 by means of a circuit path 44.

Referring to FIG. 7, the clock oscillator 40 has a CMOS-4541 integrated oscillator and programmable divider chip 46, as is manufactured by Motorola. The pins 9, 10 and 14 of the chip 46 are connected to the lead 26, while the pins 5, 6, 7, 12 and 13 are bypassed to ground through a lead 48.

An external RC network 50 comprises a variable resistor 52 connected to a pin 3 of the chip 46, a capacitor 54 connected to a pin 2 of the chip 46, and a resistor 56 connected to a pin 1 of the chip 46. The resistors 52, 56 and the capacitor 54 are interconnected by a lead 58. Preferably, the external RC network 50 has a normal operating frequency of 18,678 Hz., and the divider section of the chip 46 divides the oscillator frequency to provide an output of 2.28 Hz. at a pin 8. A lead 60 couples the pin 8 of the chip 46 to a momentary contact, SPDT switch 62, the opposite pole of the latter interconnected through a lead 64 to the external RC network 50. Thus, a circuit path 66 connected to the switch 62 is normally coupled to the 2.28 Hz. output frequency from the pin 8 of the chip 46, although the switch 62 may be manually actuated to provide a 18,678 Hz. output from the external RC network 50 to the circuit path 66.

The clock oscillator 40 also includes a CMOS 4001 Quad NOR gate 68, as is also manufactured by Motorola. The circuit path 66 is operably coupled to pins 2, 6 and 9 of the NOR gate 68, while pins 1, 5, 7, 8 and 12 are connected to ground by a lead 70. A pin 14 of the NOR gate 68 is connected to the supply voltage through the lead 26. An output pulse is provided at pins 3 and 4 of the NOR gate 68 when the latter receives no input pulse through the circuit path 66. Additionally, an LED 72 is connected by a lead 74 to pins 10 and 13 of the NOR gate 68, while the LED 72 is also coupled by a lead 76 to a pin 11 of the NOR gate 68. The LED 72 serves as an indicator of the position of the switch 62.

Referring to FIG. 7, a pulse counter means is comprised of a second 4541 chip 78, similar to the chip 46, and is coupled with the clock oscillator 40 to receive pulses from the latter. Thus, the pins 3 and 4 of the NOR gate 68 are operably coupled by a lead 80 to a pin 3 of the chip 78. The pins 12, 13, and 14 of the chip 78 are interconnected to the lead 26, while the pins 5, 7, 9 and 10 are bypassed to ground through a lead 82. The chip 78 has a reset terminal, pin 6, adapted to have an electrical reset signal applied thereto for reinitializing the count of the chip 78, and also has a timer output terminal, pin 8, at which an electrical timer output signal is presented whenever the chip 78 has counted a predetermined number of pulses following reinitialization thereof.

Each of the modules 19 has a horizontal row of ten battery support means 84 as illustrated in FIG. 1. Each of the battery support means 84 comprises a rectangular holder 86 having an inclined wall 88 and an inclined end 90, the holder 86 configured to receive a rechargeable, rectangular 9-volt "transistor" battery 92 in either of a pair of alternate orientations thereof. The battery 92 has a positive terminal 94 and a negative terminal 96. Also, the end 90 of the holder 86 has a pair of electrical connector means, each comprising a high silver content metal mesh contact 98, 100 disposed for engagement with the terminals 94, 96 of the battery 92 when the latter is in either of said orientations.

A first circuit means couples the output terminals 22 of the power supply 20 to the contacts 98, 100 of the support means 84. The first circuit means comprises the lead 26 coupled to the positive terminal 22 of the power supply 20 through the diode 38, as previously mentioned, and also comprises a resistor 102, a resistor 104 and a lead 106 coupling the resistors 102, 104 to the mesh contact 98. The first circuit means also comprises a lead 108 interconnecting the mesh contact 100 with ground.

An activating means 110 is provided with a sensing signal output terminal 112 for sensing when the battery 92 is received in said support means 84 in one of said orientations thereof and presenting an output at the sensing signal output terminal 112. The activating means 110 comprises an optoelectronic assembly 114 having an infrared-emitting diode 115 as a radiation source means and also having a phototransistor 117 as radiation sensing means. Additionally, the activating means 110 includes a reflective tape 116 affixed to one side of the battery 92 for reflecting radiation. As illustrated in FIG. 5, each of the infrared-emitting diodes 115 in the module 19 are connected in series to the lead 26 and also to ground.

The assembly 114 is mounted on a shelf 118 below an aperture 120 in the wall 88 of the holder 86, such that the assembly 114 senses when the battery 92 is received in the support means 84 in an orientation wherein the reflective tape 116 is proximal the aperture 120. The radiation path is shown by the arrows in FIG. 4. A lead 122 operably connects the phototransistor 117 to the sensing signal output terminal 112, and a lead 124 interconnects the phototransistor 117 with the ground. Additionally, a capacitor 126 is connected across the leads 122, 124.

A control means comprising a switching transistor 128 is operably coupled with the lead 26 of the first circuit means and is provided with a control input terminal 130 for selectively interrupting the first circuit means.

A second circuit means for coupling the sensing signal output terminal 112 of the activating means 110 with the control input terminal 130 of the transistor 128 is provided for causing the transistor 128 to render the first circuit means conductive. As best illustrated in FIG. 6, the second circuit means includes a CMOS 4001 Quad NOR gate 132, similar to the NOR gate 68 previously described. The NOR gate 132 has a first input terminal 134 at pin 1 thereon, a second input terminal 136 at pin 2 thereon and a logic output terminal 138 at pin 3 thereon.

The logic output terminal 138 is electrically coupled to the control input terminal 130 of the transistor 138 by means of a circuit path 140 and a resistor 142. As shown, the pins 5, 8 and 9 of the NOR gate 132 are also connected to the circuit path 140. The pins 4, 12 and 13 of the NOR gate 132 are interconnected by a lead 144, a pin 6 of the NOR gate 132 is electrically coupled to the second intput terminal 136 by a lead 146, and a pin 7 of the NOR gate 132 is coupled to ground by a lead 148. Additionally, a LED 150 is coupled by a lead 152 to a pin 10 on the NOR gate 132, the LED 150 also coupled to a lead 154 connected to a pin 11 on the NOR gate 132.

A third circuit means comprises a lead 156 for coupling the sensing signal output terminal 112 of the activating means 110 with the reset terminal, pin 6, of the chip 78 of the pulse counter means for reinitializing the latter whenever the activating means 110 senses that the battery 92 has been received in the support means 84, in an orientation such that the reflective tape 116 is proximal to the aperture 120.

A fourth circuit means is provided for operably coupling the timer output terminal of the counter means with the second circuit means for interrupting the first circuit means when the counter means has counted said predetermined number of pulses. In particular, the fourth circuit means comprises a lead 158 electrically connecting the timer output terminal, pin 8 of the chip 78, with the first input terminal 134 of the NOR gate 132.

Finally, a resister 172 is coupled to the sensing signal output terminal 112 and to the lead 26. Also, a lead 160 coupled a diode 162 to the lead 106, the diode 162 coupled to a circuit path 164 which includes a connector 166 and terminates at a reversed polarity battery alarm 168, the latter connected to ground by a lead 170.

OPERATION

In use, the battery 92 is inserted in the holder 86 in an orientation such that the reflective tape 116 faces downwardly, whereupon the terminals 94, 96 engage the contacts 98, 100 as shown in FIG. 3. Simultaneously, the phototransistor 117 detects the infrared emission from the diode 115 by means of the reflective tape 116. Because the tape 116 is affixed to only one side of the battery 92, the phototransistor 117 will detect the reflected infrared emissions only when the battery 92 is inserted as shown in the drawing.

The phototransistor 117, sensing the infrared emission reflected from the tape 116, provides a sensing signal output by pulling the capacitor 126 and the terminal 112 to ground. Simultaneously, this signal reinitializes the counting chip 78 to begin counting pulses from the clock generator 40. During the count, the output at pin 8 of the chip 78 is also grounded. Thus, following reinitialization of the chip 78, the first input terminal 134 and the second input terminal 136 on the NOR gate 132 are both grounded.

The NOR gate 132 will present a logic output signal at the terminal 138 whenever terminals 134, 136 are both grounded. Simultaneously, the logic output signal from the NOR gate 132 is presented at the control input terminal 130 of the transistor 128, rendering the first circuit means conductive to charge the battery 92 with a full charging current.

After 65,536 pulses are counted by the counting chip 78, an electrical timer output signal is presented at pin 8 on the counting chip 78. The NOR gate 132 receives this signal at the terminal 134, and eliminates the logic output signal at the terminal 138. As a result, the transistor 128 will interrupt the first circuit means to preclude the battery 92 from receiving a full charging current.

Noteworthy is the fact that the full charging current is automatically ceased after a predetermined time. Thus, the hospital personnel need not remove the battery 92 following a complete charge thereof.

Additionally, the battery 92 will be continuously trickle charged through the resistor 104, thereby rendering the battery 92 completely charged while in the holder 86 for an indefinite period. As such, the housing 17 provides a convenient storage means for a large number of batteries, freeing the nursing personnel from handling, further storage and subsequent testing of the batteries.

Additionally, the reversed polarity battery alarm 168 provides an audible alarm whenever the battery 92 is incorrectly inserted within the holder 86. However, the activating means 110 precludes the full charging current from reaching the battery 92 in this orientation. Consequently, no damage will occur to the battery 92 once the latter is incorrectly inserted within the holder 86. In this regard, it should be noted that an arrow or other visual indicator may be affixed to an end of the battery 92 remote from the terminals 94, 96, such that the support personnel can readily identify the orientation of the battery 92.

The two-color LED 150 indicates, in red, when a full charging current is applied to the battery 92. However, after the chip 78 has reached the full count, the LED 150 turns green to show that the battery 92 is fully charged, the LED 150 remaining green until the battery 92 is removed for use. Subsequently, the LED 150 is unilluminated once the battery 92 is removed.

When the momentary contact switch 62 is depressed, the clock oscillator 40 will provide an output frequency of 18,678 Hz. in substitution for the normal output frequency of 2.28 Hz. Thus, the switch 62 can serve as a means for operationally testing the clock oscillator 40, the NOR gate 68, the counting chip 78, and the NOR gate 132 in a short period of time. Consequently, while the counting chip 78 normally reaches its full count after a period of approximately eight hours, the switch 62 can increase the frequency output of the clock oscillator 40 such that the counting chip 78 will reach its full count after three and one-half seconds. The LED 150 may be observed to indicate the completion of the counting cycle.

Noteworthy also is the fact that the battry pack 32 provides protection from power failure as is commonly encountered in hospitals. Without such a backup power facility, a power failure would otherwise reinitialize the counting chip 78, restarting the charging cycle for each battery. The capacitor 126 also prevents reinitialization of the counting chip 78 whenever the battery 92 is accidentally moved or bumped.

Additionally, each of the modules 19 may be individually removed and serviced when necessary without affecting operation of the remaining modules 19. Consequently, the battery charging system 15 provides a simple, efficient and inexpensive device for recharging and storing a multitude of batteries.

I claim:

1. A battery charging system operative to a charge a battery having a positive electrical terminal and a negative electrical terminal, said system comprising:
   supply means having a pair of output terminals for providing an electrical power output adapted for charging said battery;
   support means for receiving said battery in either of a pair of alternate orientations thereof and having a pair of electrical connector means disposed for engagement with said terminals of said battery when the latter is in either of said orientations;
   first circuit means for coupling said output terminals of said supply means with said connector means of said support means;
   control means operably coupled with said first circuit means and provided with a control input terminal for selectively interrupting said first circuit means;
   activating means provided with a sensing signal output terminal means for sensing when said battery is received in said support means in one of said orientations thereof and presenting an output at said sensing signal output terminal said activating means including radiation source means associated with said support means, radiation reflecting means on a portion of said battery, and radiation sensing means associated with said support means operably associated with said sensing signal output terminal: and second circuit means for coupling said sensing signal output terminal of said activating means with said control input terminal of said control means for causing the latter to render said first circuit means conductive.

2. The invention of claim 1, wherein there is provided:

pulse generating means for providing a series of electrical timing reference pulses;

pulse counter means coupled with said generating means for receiving said pulses from the latter and having a reset terminal adapted to have an electrical reset signal applied thereto for reinitializing said counter means, and a timer output terminal at which an electrical timer output signal is presented whenever said counter means has counted a predetermined number of pulses following reinitialization thereof;

third circuit means for coupling said sensing signal output terminal of said activating means with said reset terminal of said counter means for reinitializing the latter whenever said activating means senses that said battery has been received in said one orientation thereof by said support means; and fourth circuit means for operably coupling said timer output terminal of said counter means with said second circuit means for interrupting said first circuit means when said counter means has counted said predetermined number of pulses.

3. The invention of claim 2, wherein said second circuit means includes:

a NOR gate having a first input terminal, a second input terminal, and a logic output terminal, said first input terminal being operably coupled with said fourth circuit means;

means for electrically coupling said second input terminal of the NOR gate with said sensing signal output terminal of said activating means; and means for electrically coupling said logic output terminal of said NOR gate to said control input terminal of said control means.

4. A battery charging system operative to charge a battery having a positive electrical terminal and a negative electrical terminal, said system comprising:

a supply means having a pair of output terminals for providing an electrical power output adapted for charging said battery;

electrical connector means engageable with said terminals of said battery and operably coupled with said output terminals of said supply means;

first circuit means for coupling said output terminals of said supply means with said connector means;

control means operably associated with said first circuit means and provided with a control input terminal for selectively interrupting said first circuit means;

pulse generation means for providing a series of electrical timing reference pulses;

pulse counter means coupled with said generating means for receiving pulses from the latter, having a reset terminal adapted to have an electrical reset signal applied thereto for reinitializing said counter means and having a timer output terminal at which an electrical timer output signal is presented whenever said counter means has counted a predetermined number of pulses following reinitialization thereof; and means for operably coupling said timer output terminal of said counter means with said control input terminal of said control means for interrupting said first circuit means when said counter means has counted said predetermined number of pulses.

* * * * *